United States Patent
Ouchi et al.

(10) Patent No.: US 6,258,482 B1
(45) Date of Patent: Jul. 10, 2001

(54) HYDROGEN STORAGE ALLOY ELECTRODE AND METHOD FOR FABRICATION THEREOF

(75) Inventors: Masutaka Ouchi; Teruhiko Imoto, both of Itano-gun; Kikuko Kato, Katano; Nobuyuki Higashiyama, Ikeda; Mamoru Kimoto; Shin Fujitani, both of Hirakata; Koji Nishio, Kyoto, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/312,991

(22) Filed: May 17, 1999

(30) Foreign Application Priority Data

May 19, 1998 (JP) ................................................. 10-136990

(51) Int. Cl.[7] ...................................................... H01M 4/58
(52) U.S. Cl. .......................................................... 429/218.2

(58) Field of Search .................................. 429/218.2, 219, 429/220, 221, 223, 224, 229

(56) References Cited

FOREIGN PATENT DOCUMENTS

| 0591606 | 4/1994 | (EP) . |
| 0602768 | 6/1994 | (EP) . |
| 0777284 | 6/1997 | (EP) . |
| 60-070665 | 4/1985 | (JP) . |
| 05225975 | 9/1993 | (JP) . |
| 10214621 | 8/1998 | (JP) . |

*Primary Examiner*—Laura Weiner
(74) *Attorney, Agent, or Firm*—W. F. Fasse; W. G. Fasse (57) ABSTRACT

A hydrogen storage alloy electrode for a battery is made of a hydrogen storage alloy powder which includes agglomerates of hydrogen storage alloy particles joined together through a metallic layer. A method of making the electrode includes forming agglomerates of hydrogen storage alloy particles joined together by a metallic layer which covers surface portions of the particles, and then forming the electrode using a resulting powder including the agglomerates.

21 Claims, 1 Drawing Sheet

Fig.1

HYDROGEN STORAGE ALLOY ELECTRODE AND METHOD FOR FABRICATION THEREOF

BACKGROUND OF THE INVENTION

1. Field of the Invention

The present invention relates to a hydrogen storage alloy electrode, particularly suitable for use as a negative electrode of alkaline storage cells or batteries, and to a method for fabrication of the hydrogen storage alloy electrode.

2. Related Art

A nickel-hydrogen storage cell or battery is regarded as a prime candidate for the alkaline battery of the next generation, because of its high capacity, more than twice of that of a nickel-cadmium battery, and its environmentally friendly nature.

Such alkaline batteries typically use a hydrogen storage alloy electrode. There generally exists two types of hydrogen storage alloy electrodes; a sintered hydrogen storage alloy electrode prepared by sintering hydrogen storage alloy powder, and a pasted hydrogen storage alloy electrode prepared by coating or loading a paste containing hydrogen storage alloy powder particles on or in an electrically conductive core. However, these two types of hydrogen storage alloy electrodes suffer from a common deficiency. As the electrode undergoes a change in its volume during the charge-discharge cycles, the hydrogen storage alloy powder incorporated therein is often subjected to subdivision to result in the occurrence of falling-off or shedding of the subdivided powder particles. This has led to the reduced initial discharge capacities as well as the shortened charge-discharge cycle lives of alkaline batteries using those hydrogen storage alloy electrodes.

In order to overcome the above-described deficiency, a method has been proposed, for example in Japanese Patent Laying-Open No. 60-70665 (1985), which utilizes hydrogen storage alloy powder of smaller particle sizes. The use of the size-reduced hydrogen storage alloy powder results in the reduced occurrence of subdivision, so that the shedding of powder particles is effectively suppressed. Fabrication of an electrode from the size-reduced hydrogen storage alloy powder, in accordance with the proposed method, allows for a large electrode surface area. An alkaline storage battery using such an electrode is thus expected to produce a high level of discharge capacity.

However, the size-reduced hydrogen storage alloy powder is readily oxidized in the air to produce electrically inert surface films, such as oxide films. Accordingly, an alkaline storage battery incorporating such a hydrogen storage alloy powder in its negative electrode fails to enjoy the expected improvements in cycle life and discharge characteristics. In addition, the failure to suppress the generation of hydrogen gas during charge leads to an unfavorable pressure build-up in the battery.

SUMMARY OF THE INVENTION

An object of the present invention is to provide a hydrogen storage alloy electrode which utilizes fine hydrogen storage alloy particles excellent in charge-discharge cycling characteristics, which exhibits excellent initial discharge characteristics and which can effectively suppress the build-up of an internal pressure of a battery during charge. Another object of the present invention is to provide a method for fabrication of such a hydrogen storage alloy electrode.

A hydrogen storage alloy electrode of the present invention is comprised of a hydrogen storage alloy powder which characteristically includes agglomerates of hydrogen storage alloy particles joined together through a metallic layer.

In accordance with the present invention, the hydrogen storage alloy powder includes the agglomerates of hydrogen storage alloy particles joined together through a metallic layer. In such agglomerates, the metallic layer covers surface portions of the hydrogen storage alloy particles to reduce exposed surface areas thereof which will be subjected to oxidation. Thus, the surface oxidation of hydrogen storage alloy is suppressed.

The coverage of alloy particles with the metallic layer lessens the surface energy of fine alloy particles, initially maintained at a high level, so that the alloy surfaces are allowed to shift to a more stable state. This also results in suppressing the surface oxidation of the hydrogen storage alloy.

Furthermore, since the hydrogen storage alloy particles are joined together by the metallic layer, the contact resistance therebetween is effectively reduced. Therefore, the use of the hydrogen storage alloy electrode of the present invention results not only in the increased initial discharge capacity of a cell or battery, but also in the improved gas-absorbing performance that effectively suppresses the build-up of internal pressure of the cell or battery during charge.

In accordance with a first aspect of the present invention, the agglomerates included in the hydrogen storage alloy powder are characterized as being comprised of hydrogen storage alloy particles of sizes not exceeding 25 $\mu$m.

The "hydrogen storage alloy particles of sizes not exceeding 25 $\mu$m", as used herein, refer to those alloy particles which, when subjected to sieving with a 500-mesh screen, pass through the screen openings and have a maximum particle size of not exceeding 25 $\mu$m.

In the first aspect, the hydrogen storage alloy powder may be comprised of a combination of the aforementioned agglomerates of hydrogen storage alloy particles of sizes not exceeding 25 $\mu$m and the unjoined hydrogen storage alloy particles of sizes exceeding 25 $\mu$m but not exceeding 100 $\mu$m. The "hydrogen storage alloy particles of sizes exceeding 25 $\mu$m but not exceeding 100 $\mu$m", as used herein, refer to those alloy particles which, when subjected to sieving, pass through a 200-mesh screen but remain on a 500-mesh screen. In such a combination, finer alloy particles, i.e., the hydrogen storage alloy particles of sizes not exceeding 25 $\mu$m are joined together by the metallic layer to take the form of agglomerates, so that the surface oxidation thereof in the air can be suppressed.

In a second aspect of the present invention, the aforementioned agglomerates are characterized as being comprised of hydrogen storage alloy particles of sizes not exceeding 100 $\mu$m. In this second aspect, those alloy particles of sizes exceeding 25 $\mu$m are also joined together by the metallic layer to take the form of agglomerates. This eliminates the necessity of sieving to classify the alloy particles of sizes not exceeding 25 $\mu$m. Accordingly, a procedure of obtaining the agglomerates is simplified.

Like the hydrogen storage alloy particles of sizes not exceeding 25 $\mu$m, the hydrogen storage alloy particles of sizes not exceeding 100 $\mu$m, if rendered into the form of the above-defined agglomeration, are less subjected to surface oxidation. The contact resistance between the alloy particles can also be reduced. This is considered due to the tendency of the fine hydrogen storage alloy particles to cohere to each other or to adsorb the larger-size alloy particles for shift to a more stable state.

The hydrogen storage alloy particles for use in the present invention can be made in an electric-arc melting furnace under argon atmosphere, for example. They can also be made by other techniques such as gas atomization and roll quenching.

In the present invention, the metallic layer which joins the alloy particles can be formed, for example, from at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb).

The metallic layer can be produced in the form of a deposit of any of the listed metals on surfaces of the hydrogen storage alloy particles, for example, by immersing the alloy particles in an acid solution into which a metallic compound is dissolved containing at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb). The metallic ions present in the acid solution are reduced to deposit on alloy particle surfaces via an oxidation-reduction reaction with a base element contained in the hydrogen storage alloy particles. The metallic layer thus produced in the form of a metallic deposit provides bridges or connections between the hydrogen storage alloy particles to form the agglomerates.

Those metallic ions can be incorporated in the acid solution by dissolving therein a metallic compound such as a metallic chloride, sulfate, nitrate, oxide or hydroxide. Preferably, such a metallic compound is added to the acid solution in the amount of 1.0–10.0 parts by weight, based on 100 parts by weight of the hydrogen storage alloy particles. The addition of the metallic compound in the amount of less than 1.0 part by weight may result in the insufficient deposition in amount of the metallic layer to desirably join the hydrogen storage alloy particles. On the other hand, the addition of the metallic compound in the amount of higher than 10.0 parts by weight may result in the excessive deposition in amount of the metallic layer. If the resulting agglomerations are incorporated in a battery electrode, such a metallic layer may in some cases interfere with an electrochemical reaction between the hydrogen storage alloy particles and an electrolyte.

Examples of the aforementioned acid solutions include aqueous solutions of hydrochloric acid, nitric acid and phosphoric acid. Preferably, a pH of the acid solution is maintained in the range of 0.7–2.0. If the pH falls below 0.7, the dissolution of hydrogen storage alloy particles per se may be caused to occur in the acid solution. On the other hand, if the pH goes beyond 2.0, the elution of the species contained in the hydrogen storage alloy may be made difficult to result in the insufficient occurrence of the reduction reaction to deposit the metallic layer.

In the present invention, another method can also be employed which involves mixing the hydrogen storage alloy particles with a powder of at least one metal selected from the group consisting of indium (In), tin (sn) and zinc (Zn) and subjecting the resulting mixture to heat treatment, whereby the hydrogen storage alloy particles are joined together through a metallic layer formed from the metallic powder to produce the agglomerates. It is believed that when the mixture of the low-melting metallic powder and the hydrogen storage alloy particles is subjected to heat treatment, as described above, the surface portions of hydrogen storage alloy particles and the metallic powder are caused to produce the metallic layer in the form of a solid solution. This metallic layer provides connections between the alloy particles to produce the agglomerations thereof. Preferably, the heat treatment is carried out at a temperature within a range from a melting point of the particular metallic powder selected to 500° C. If the treatment temperature goes beyond 500° C., the metallic powder on the alloy surface may be completely embedded within the alloy in the form of a solid solution to result in the failure to provide connections between the alloy particles.

It is preferred that the metallic powder is added in the amount of 0.5–10.0 parts by weight, based on 100 parts by weight of the hydrogen storage alloy particles. The addition of the metallic powder in the amount of less than 0.5 parts by weight may result in the formation of metallic layer insufficient in amount to desirably join the hydrogen storage alloy particles. On the other hand, the addition of the metallic powder in the amount of higher than 10.0 parts by weight may result in the excessive formation of the metallic layer. If the resulting agglomerates are incorporated in a battery electrode, the excessive amount of metallic layer may in some cases inhibit an electrochemical reaction between storage alloy particles and an electrolyte.

A hydrogen storage alloy electrode of the present invention can be fabricated utilizing the above-specified hydrogen storage alloy powder. For example, a pasted hydrogen storage alloy electrode can be fabricated by coating or loading a paste containing the above-specified hydrogen storage alloy powder on or in an electrically conductive core as of a punched metal or foam metal. In the case of fabrication of a sintered hydrogen storage alloy electrode, the hydrogen storage alloy powder may be pressed into a compact form which is subsequently sintered.

A method of the present invention is directed toward the fabrication of the hydrogen storage alloy electrode of the present invention. The method encompasses joining hydrogen storage alloy particles through a metallic layer to form agglomerates and using a hydrogen storage alloy powder containing the agglomerates to fabricate a hydrogen storage alloy electrode.

In the fabricating method of the present invention, those two specific techniques as described hereinabove may be selectively employed to join the alloy particles to form the agglomerates, for example.

That is, one technique is to immerse the hydrogen storage alloy particles in an acid solution into which a metallic compound is dissolved containing at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb), whereby a metallic layer is produced in the form of a deposit of the selected metal on surfaces of the hydrogen storage alloy particles, which joins the alloy particles to form the agglomerates.

Preferably, the pH of the acid solution is kept within the range of 0.7–2.0, as stated above. As also stated above, the metallic compound content of the acid solution is preferably in the range of 1.0–10.0 parts by weight, based on 100 parts by weight of the hydrogen storage alloy particles.

Another technique is to mix the hydrogen storage alloy particles with a powder of at least one metal selected from the group consisting of indium (In), tin (sn) and zinc (Zn) and then heat the resulting mixture under inert atmosphere to a temperature within a range from a melting point of the metallic powder to 500° C. to thereby produce the metallic layer through which the hydrogen storage alloy particles are joined to assume the form of agglomerates.

As described above, the addition amount of the metallic powder is preferably in the range of 1.0–10.0 parts by weight, based on 100 parts by weight of the hydrogen storage alloy particles.

EXPLANATION OF THE PREFERRED EMBODIMENTS

Experiment 1

Experiment 1 was conducted to investigate the effect of the agglomerate content of the hydrogen storage alloy powder on the operational characteristics of a battery.

(a) Formation of an $MmNi_{3.1}Co_{0.8}Al_{0.4}Mn_{0.7}$ Alloy

A misch metal (Mm) was prepared containing 25 wt % of lanthanum (La), 50 wt % of cerium (Ce), 6 wt. % of praseodymium (Pr) and 19 wt. % of neodymium (Nd). The misch metal prepared was then mixed with a group of 99.9% pure metals, i.e., with nickel (Ni), cobalt (Co), aluminum (Al) and manganese (Mn) in the ratio of Mm:Ni:Co:Al:Mn= 1.0:3.1:0.8:0.4:0.7 (molar ratio). The mixture was melted in an electric-arc melting furnace under an argon atmosphere and subsequently allowed to cool naturally, so that a hydrogen storage alloy represented by the formula $MmNi_{3.1}Co_{0.8}Al_{0.4}Mn_{0.7}$ was formed. An ingot of the hydrogen storage alloy thus formed was then mechanically pulverized in the air into particles which were subsequently subjected to sieving with a 200-mech screen. The alloy particles which passed through the screen openings were collected as an alloy powder #1. As a result, the alloy powder #1 consisted of the alloy particles of sizes not exceeding 100 μm.

The alloy powder #1 was further sieved with a 500-mesh screen. The alloy particles which passed through the screen openings were collected as an alloy powder #2. The alloy powder #2 consisted of the alloy particles of sizes not exceeding 25 μm.

Also, a fraction of the alloy powder #1, i.e. exclusive of the alloy powder #2, was classified as an alloy powder #3. That is, the alloy powder #3 was the fraction of the alloy powder #1 retained by the 500-mesh screen. The alloy powder #3 thus consisted of the alloy particles having a particle size range of 25–100 μm.

3.0 wt. % of silver chloride (AgCl) was incorporated in an aqueous solution of hydrochloric acid, as an acid solution, which was subsequently adjusted to pH 1.0 to provide a treating solution. The treating solution was then maintained at 25° C. The alloy powder #2 was immersed with agitation in the treating solution for the duration of 15 minutes. A sequence of suction filtration, rinsing with water and drying was followed to obtain the agglomerates of the alloy particles joined together. It was found that the starting material, i.e., the alloy particles were joined together by a metallic layer comprised of silver to form the agglomerates. The agglomerates of hydrogen storage alloy particles thus obtained were collected as an alloy powder #4.

The respective specifications of the alloy powders #1 through #4 are summarized in Table 1.

TABLE

| ALLOY POWDER # | COMPOSITION |
|---|---|
| 1 | ALLOY PARTICLES OF SIZES ≤ 100 μm |
| 2 | ALLOY PARTICLES OF SIZES ≤ 25 μm |
| 3 | ALLOY PARTICLES OF SIZES > 25 μm AND ≤ 100 μm |
| 4 | AGGLOMERATES OF ALLOY PARTICLES OF SIZES ≤ 25 μm |

(b) Preparation of Sample Powders for use in Electrodes

The aforementioned alloy powders #3 and #4 were mixed at the different ratios as listed in Table 2 to obtain sample powders "A-1" through "A-6".

TABLE 2

| DESIGNATION OF SAMPLE POWDER | ALLOY POWDER #3 (wt. %) | ALLOY POWDER #4 (wt. %) |
|---|---|---|
| A1 | 0 | 100 |
| A2 | 10 | 90 |
| A3 | 30 | 70 |
| A4 | 50 | 50 |
| A5 | 70 | 30 |
| A6 | 90 | 10 |

For comparative purposes, the aforementioned alloy powders #1 and #2 were left untreated to use as sample powders "X" and "Y", respectively.

In addition, an aqueous solution of hydrochloric acid was prepared, adjusted to pH 1.0, and maintained at 25° C. The alloy powder #1 was immersed with agitation in the solution for the duration of 15 minutes. A sequence of suction filtration, rinsing with water and drying was followed to obtain a sample powder "Z".

(c) Assembly of an Alkaline Battery

Each of the aforementioned sample powders A-1 through A-6 and X through Z, in the amount of 100 parts by weight, was mixed with 20 parts by weight of an aqueous solution of 5 wt. % PEO (polyethylene oxide), as a binder, to prepare a paste. The paste was then coated on opposite surfaces of a core, in the form of a nickel-plated punched metal plate, which was subsequently dried at room temperature and cut to a predetermined dimension to fabricate a hydrogen storage alloy electrode.

The hydrogen storage alloy electrode may alternatively be fabricated by loading each sample powder in a core composed of a highly porous structure having a three-dimensionally connected porous network, as represented by foam nickel.

By using each hydrogen storage alloy electrode for a negative electrode, a positive-limited AA-size alkaline battery (capacity of 1000 mAh) was assembled. A conventionally-known sintered nickel electrode was used as a positive electrode, an alkali-resistant nonwoven fabric as a separator, and an aqueous solution of 30 wt. % potassium hydroxide as an electrolyte.

Figure 1:
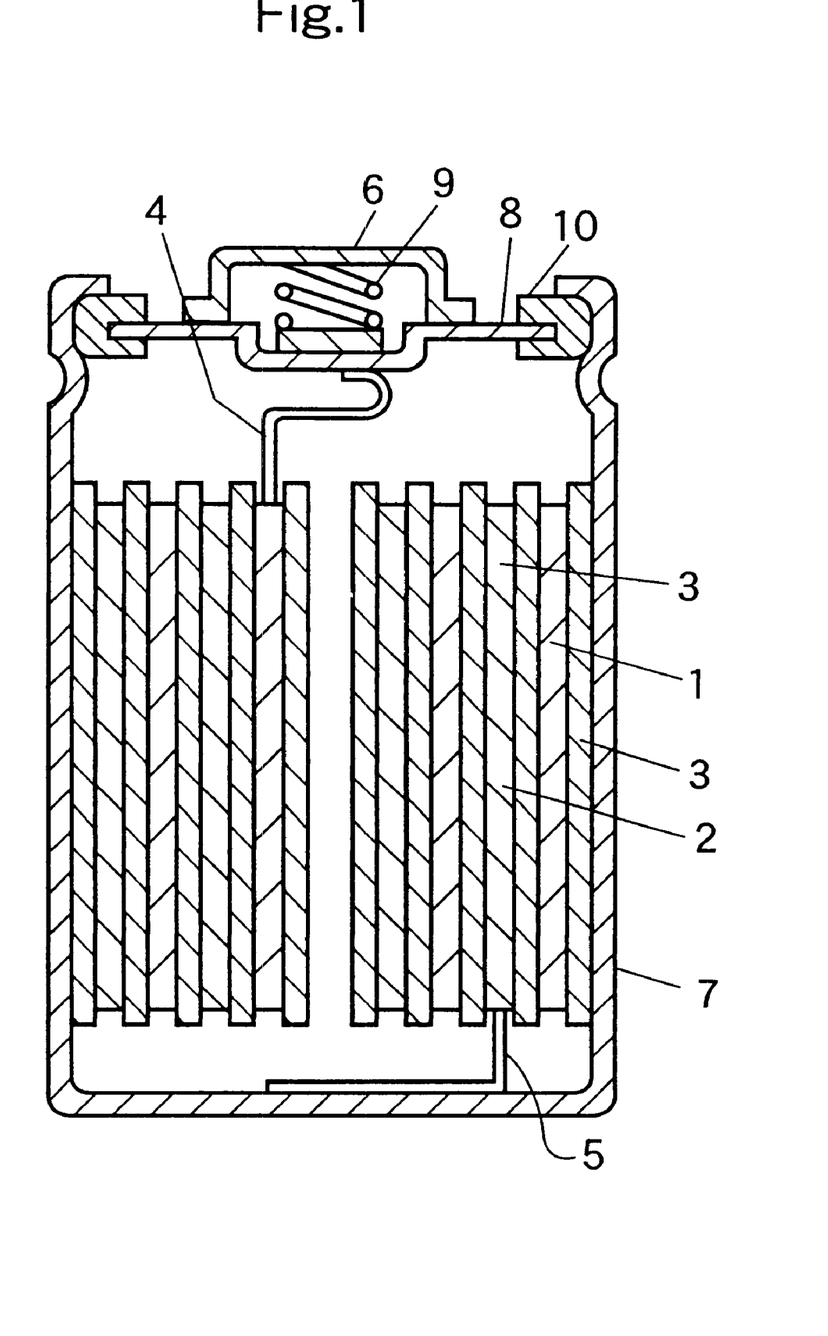
FIG. 1 is a sectional view, illustrating an alkaline storage battery construction in accordance with the present invention.

FIG. 1 is a schematic sectional view of an alkaline storage battery assembled by using the aforementioned constituent materials. As shown in FIG. 1, the alkaline storage battery includes a positive electrode 1, a negative electrode 2, a separator 3, a positive lead 4, a negative lead 5, an external positive terminal 6, a negative can 7 and a sealing lid 8. The positive electrode 1 and negative electrode 2 are spirally wound, with the separator being interposed therebetween, for insertion into the negative can 7. The positive electrode 1 is electrically connected through the positive lead 4 to the sealing lid 8, while the negative electrode 2 is electrically connected through the negative lead 5 to the negative can 7. An insulating gasket 10 is placed between the sealing lid 8 and the negative can 7 for connection thereof, so that the battery is sealed. Located between the external positive terminal 6 and the sealing lid 8 is a coil spring 9 designed such that when an abnormal pressure build-up occurs in the battery, it is compressively urged to release a gas in the battery to the atmosphere.

(d) Evaluation of the Build-up of Pressure in the Battery

Each alkaline storage battery was charged at the 1.0 C rate and at 25° C. while monitoring the change of pressure in the battery. A charge time was measured during which the internal pressure of the battery reached 10 kgf/cm$^2$.

(e) Evaluation of Initial Discharge Characteristics of the Battery

Each battery was charged at the 0.2 C rate and at 25° C. for 6 hours and thereafter discharged at the 1.0 C rate and at 25° C. to 1.0 V. A discharge capacity in milliampere-hour (mAh) after one cycle was determined for each battery.

The charge time during which the internal pressure of the battery reached 10 kgf/cm$^2$, as well as the initial discharge capacity, were determined for the batteries incorporating the sample powders A-1 through A-6, X and Y, as their respective negative materials. The results are given in Table 3. The amount of alloy particles existing in the form of agglomerates in each sample powder, i.e., the agglomerate content of each sample powder is also given in Table 3.

TABLE 3

| DESIGNATION OF SAMPLE POWDER | AGGLOMERATE CONTENT (wt. %) | PRESSURE BUILD-UP TIME (min) | INITIAL DISCHARGE CAPACITY (mAh) |
| --- | --- | --- | --- |
| A1 | 100 | 115 | 690 |
| A2 | 90 | 120 | 720 |
| A3 | 70 | 130 | 790 |
| A4 | 50 | 135 | 750 |
| A5 | 30 | 135 | 760 |
| A6 | 10 | 120 | 760 |
| X | 0 | 85 | 630 |
| Y | 0 | 95 | 620 |

As can be appreciated from Table 3, the charge time (or pressure build-up time), during which the internal pressure of the battery reached 10 kgf/cm$^2$, is increased in duration for an alkaline storage battery incorporating any one of the sample powders A-1 through A-6 in its negative electrode in comparison to an alkaline storage battery incorporating the sample powder X or Y in its negative electrode. This demonstrates that the pressure build-up in the battery can be suppressed if the hydrogen storage alloy particles of sizes not exceeding 25 μm are included in the hydrogen storage alloy electrode in the form of agglomerates thereof.

As can be appreciated from Table 3, an increased initial discharge capacity is measured for an alkaline storage battery incorporating any one of the sample powders A-1 through A-6 in its negative electrode in comparison to an alkaline storage battery incorporating the sample powder X or Y in its negative electrode.

As will be appreciated from the results obtained with the use of the battery incorporating the sample powder A-1 in its negative electrode, the purposes of the present invention, such as the suppression of pressure build-up in the battery and the increase of initial discharge capacity, can be achieved even if the hydrogen storage alloy electrode consists solely of the alloy particles in the form of agglomerates. This demonstrates that the hydrogen storage alloy powder may consist solely of the agglomerates of alloy particles joined together through a metallic layer for the purposes of the present invention.

Experiment 2

Experiment 2 was conducted to make investigations on the type of the metallic compound for use in the formation of the metallic layer for joining the hydrogen storage alloy particles.

Cobalt chloride ($CoCl_2$), copper chloride ($CuCl_2$), palladium chloride ($PdCl_2$) or silver chloride (AgCl) was added to an aqueous solution of hydrochloric acid (acid solution) in the amount of 3.0 parts by weight, based on 100 parts by weight of the alloy powder #1. Each mixture was adjusted to pH 1.0 to prepare a treating solution. The alloy powder #1 was immersed with agitation in each treating solution maintained at 25° C. for the duration of 15 minutes. A sequence of suction filtration, rinsing with water and drying was followed. As a result, sample powders "B-1" through "B-4" were obtained.

Each sample powder obtained was subjected to sieving with a 500-mesh screen to weigh the alloy particles of sizes not exceeding 25 μm which passed through the screen openings. Prior to being treated with each treating solution, the untreated alloy powder #1 had been similarly sieved with a 500-mesh screen to weigh the alloy particles of sizes not exceeding 25 μm passing through the screen openings. A ratio of a weight of the alloy particles of sizes not exceeding 25 μm joined by a metallic layer to take the form of agglomerates to a total weight of the alloy particles of sizes not exceeding 25 μm, i.e., a level of agglomeration was calculated for the alloy particles of sizes not exceeding 25 μm from the following equation:

$$\text{Level of agglomeration} = (A-B)/A$$

where,

A=weight of the untreated alloy powder #1 particles which passed through the 500-mesh screen; and B=weight of the treated alloy powder #1 particles which passed through the 500-mesh screen.

The level of agglomeration measured to exceed 60 weight % for each of the sample powders B-1 through B-4.

As analogous to Experiment 1, the sample powders B-1 through B-4 thus prepared were used to assemble alkaline storage batteries for measurement of pressure build-up time and initial discharge characteristics. The results are given in Table 4. The types of the metallic compounds used and the levels of agglomeration calculated are also indicated in Table 4.

TABLE 4

| DESIGNATION OF SAMPLE POWDER | METALLIC COMPOUND | LOA* (wt. %) | PRESSURE BUILD-UP TIME (min) | INITIAL DISCHARGE CAPACITY (mAh) |
| --- | --- | --- | --- | --- |
| B1 | COBALT CHLORIDE | 62 | 125 | 750 |
| B2 | COPPER CHLORIDE | 67 | 135 | 770 |
| B3 | PALLADIUM CHLORIDE | 85 | 135 | 780 |
| B4 | SILVER CHLORIDE | 86 | 140 | 790 |

TABLE 4-continued

| DESIGNATION OF SAMPLE POWDER | METALLIC COMPOUND | LOA* (wt. %) | PRESSURE BUILD-UP TIME (min) | INITIAL DISCHARGE CAPACITY (mAh) |
|---|---|---|---|---|
| Y | — | — | 95 | 620 |
| Z | — | — | 105 | 650 |

*LOA = LEVEL OF AGGLOMERATION

As will be appreciated from Table 4, the respective alkaline storage battery exhibits a higher level of initial discharge capacity and a lower level of internal pressure build-up when incorporating any one of the sample powders B-1 through B-4 in its negative electrode than when incorporating the sample powder Y or Z in its negative electrode. pressure build-up when incorporating any one of the sample powders B-1 through B-4 in its negative electrode than when incorporating the sample powder Y or Z in its negative electrode.

Only the metallic chlorides were used above as the illustrated additive compounds. However, the aforementioned effects are similarly attainable by the use of other metallic compounds such as metallic sulfates, nitrates, oxides and hydroxides. The hydrogen storage alloy particles, if immersed in a treating solution containing any of such metallic compounds dissolved in an acid solution, are similarly joined together through a metallic layer to form the agglomerates. It has also been recognized that the similar results can be obtained with the use of the treating solution into which a metallic compound is dissolved containing scandium, titanium, vanadium, chromium, manganese, iron, nickel, zinc, molybdenum, indium, tin or antimony, in the place of cobalt, palladium, copper or silver.

Experiment 3

Experiment 3 was conducted to investigate the dependence of battery performance on concentrations of the metallic compound in the acid solution. The additive compound used was silver chloride (AgCl).

Silver chloride was added to an aqueous solution of hydrochloric acid in the amount, by weight, of 0.5 parts, 1.0 part, 3.0 parts, 5.0 parts, 7.0 parts, 10.0 parts and 15.0 parts, based on 100 parts by weight of the alloy powder #1 to be treated. Each mixture was adjusted to pH 1.0 to prepare a treating solution. The alloy powder #1 was immersed with agitation in each treating solution maintained at 25° C. for the duration of 15 minutes. A sequence of suction filtration, rinsing with water and drying was followed. As a result, sample powders "C-1" through "C-7" were obtained.

As analogous to the above-described Experiment 1, each of the sample powders C-1 through C-7 thus prepared was used to fabricate a hydrogen storage alloy electrode for subsequent assembly into an alkaline storage battery. The pressure build-up time and initial discharge characteristics were measured. The results are given in Table 5. Since the sample powder C-1 is equivalent to the sample powder B-4 of Experiment 2, the designation B-4 is indicated in parentheses following the designation C-3 in Table 5.

TABLE 5

| DESIGNATION OF SAMPLE POWDER | CONCENTRATION OF SILVER CHLORIDE (parts by weight) | PRESSURE BUILD-UP TIME (min) | INITIAL DISCHARGE CAPACITY (mAh) |
|---|---|---|---|
| C1 | 0.5 | 120 | 660 |
| C2 | 1.0 | 130 | 730 |
| C3 (B4) | 3.0 | 140 | 790 |
| C4 | 5.0 | 135 | 770 |
| C5 | 7.0 | 120 | 710 |
| C6 | 10.0 | 115 | 690 |
| C7 | 15.0 | 105 | 680 |
| Y | — | 95 | 620 |
| Z | — | 105 | 650 |

As can be seen from Table 5, the respective alkaline storage battery exhibits a lower level of pressure build-up when incorporating any one of the sample powders C-1 through C-6 in its negative electrode than when incorporating the sample powder Y or Z in its negative electrode. As can also be appreciated from Table 5, the respective alkaline storage battery exhibits a higher level of initial discharge capacity when incorporating any one of the sample powders C-1 through C-7 in its negative electrode than when incorporating the sample powder Y or Z in its negative electrode.

It has been found from these results that the addition amount of the silver compound is preferably in the range of 0.5–15.0 parts by weight, more preferably in the range of 1.0–10.0 parts by weight, based on 100 parts by weight of the hydrogen storage alloy particles.

The use of silver chloride as the metallic compound is only illustrative. Other silver compounds such as silver sulfate, nitrate, oxide and hydroxide can also be used. The hydrogen storage alloy particles, if immersed in a treating solution containing any of such silver compounds dissolved in an acid solution, are similarly joined together through a silver layer to form the agglomerates. It has also been recognized that the similar results are obtainable if the silver compound is replaced by a cobalt, palladium, copper, scandium, titanium, vanadium, chromium, manganese, iron, nickel, zinc, molybdenum, indium, tin or antimony compound.

Experiment 4

Experiment 4 was conducted to investigate the dependence of battery performance on pH's of a treating bath containing a metallic compound dissolved in an acid solution. Silver chloride (AgCl) was used as the additive compound.

Silver chloride (AgCl) was added to an aqueous solution of hydrochloric acid (acid solution) in the amount of 3.0 parts by weight, based on 100 parts by weight of the alloy powder #1 to be treated. For preparation of treating solutions, each mixture was adjusted to different pH values; 0.5, 0.7, 1.5, 2.0 and 3.0. The alloy powder #1 was then immersed with agitation in each treating solution maintained at 25° C. for the duration of 15 minutes. A sequence of suction filtration, rinsing with water and drying was followed. As a result, sample powders "D-1" through "D-6" were obtained.

As analogous to the above-described Experiment 1, each of the sample powders D-1 through D-6 thus prepared was used to fabricate a hydrogen storage alloy electrode which was then assembled into an alkaline storage battery for measurement of pressure build-up time and initial discharge characteristics. The results are given in Table 6. Since the sample powder D-3 is equivalent to the sample powder B-4 of Experiment 2, the designation B-4 is indicated in parentheses following the designation D-3 in Table 6.

TABLE 6

| DESIGNATION OF SAMPLE POWDER | pH | PRESSURE BUILD-UP TIME (min) | INITIAL DISCHARGE CAPACITY (mAh) |
|---|---|---|---|
| D1 | 0.5 | 120 | 660 |
| D2 | 0.7 | 125 | 730 |
| D3 (B4) | 1.0 | 140 | 790 |
| D4 | 1.5 | 135 | 760 |
| D5 | 2.0 | 120 | 710 |
| D6 | 3.0 | 105 | 680 |
| Y | — | 95 | 620 |
| Z | 1.0 | 105 | 650 |

As can be appreciated from Table 6, the respective alkaline storage battery exhibits a lower level of internal pressure build-up when incorporating any one of the sample powders D-1 through D-5 in its negative electrode than when incorporating the sample powder Y or Z in its negative electrode. As can also be appreciated from Table 6, the respective alkaline storage battery exhibits a higher level of initial discharge capacity when incorporating any one of the sample powders D-1 through D-6 in its negative electrode than when incorporating the sample powder Y or Z in its negative electrode.

It has been found from these results that the pH of the treating solution is preferably in the range of 0.5–3.0, more preferably in the range of 0.7–2.0.

In the Experiment 4, silver chloride was used as the illustrative metallic compound. The above-specified pH ranges also apply to the cases where other silver compounds, such as silver sulfate, nitrate, oxide and hydroxide, are used. That is, a treating solution containing any of such silver compounds dissolved in an acid solution is preferably kept within the above-specified pH range. It has also been recognized that the similar results are obtainable if the silver compound is replaced by a cobalt, palladium, copper, scandium, titanium, vanadium, chromium, manganese, iron, nickel, zinc, molybdenum, indium, tin or antimony compound.

Experiment 5

Experiment 5 followed the alternative method including the sequence of mixing the hydrogen storage alloy particles with a metallic powder and subjecting the mixture to heat treatment for the formation of the agglomerates of the alloy particles joined together through a metallic layer.

1.0 part by weight of an indium (In), tin (Sn) or zinc (Zn) powder was mixed with 100 parts by weight of the alloy powder #1 of Experiment 1 to prepare three types of sample mixtures. Each sample mixture was placed in an electric furnace with the flow of an inert gas, an argon gas, for heat treatment at a temperature about 50° C. higher than a melting point of the metallic powder contained in the sample mixture for 60 minutes, and subsequently allowed to cool naturally to a room temperature. As a result, sample powders "E-1" through "E-3" were obtained.

The melting points of the In, Sn and Zn powders were 156° C., 232° C. and 419° C., respectively. Applicable inert gas, other than the argon gas, includes a helium (He) and nitrogen ($N_2$) gas.

A ratio of a weight of the alloy particles of sizes not exceeding 25 μm joined by a metallic layer to take the form of agglomerates to a total weight of the alloy particles of sizes not exceeding 25 μm, i.e., a level of agglomeration was calculated for the alloy particles of sizes not exceeding 25 μm in the same manner as in Experiment 2. Every sample powder exhibited the level of agglomeration of not less than 75 weight %.

As analogous to the above-described Experiment 1, each of the sample powders E-1 through E-3 thus prepared was used to fabricate a hydrogen storage alloy electrode which was then assembled into an alkaline storage battery for measurement of pressure build-up time and initial discharge characteristics. The results are given in Table 7.

TABLE 7

| DESIGNATION OF SAMPLE POWDER | METALLIC POWDER | LOA* (wt. %) | TREATMENT TEMPERATURE (° C.) | PRESSURE BUILD-UP TIME (min) | INITIAL DISCHARGE CAPACITY (mAh) |
|---|---|---|---|---|---|
| E1 | INDIUM | 82 | 200 | 160 | 830 |
| E2 | TIN | 78 | 300 | 145 | 800 |
| E3 | ZINC | 75 | 450 | 140 | 780 |
| Y | — | — | — | 95 | 620 |

*LOA = LEVEL OF AGGLOMERATION

As can be appreciated from Table 7, the respective alkaline storage battery exhibits a lower level of internal pressure build-up when incorporating any one of the sample powders E-1 through E-3 in its negative electrode than when incorporating the sample powder Y in its negative electrode. As can also be appreciated from Table 7, the respective alkaline storage battery exhibits a higher level of initial discharge capacity when incorporating any one of the sample powders E-1 through E-3 in its negative electrode than when incorporating the sample powder Y in its negative electrode.

It has been confirmed that the practice of a sequence of mixing an indium, tin or zinc powder with the hydrogen storage alloy particles and subjecting the mixture to heat treatment actually results in the production of the agglomerates in accordance with the present invention.

Experiment 6

Experiment 6 was conducted to investigate the dependence of battery performance on the amounts of the indium powder added for mixture with the hydrogen storage particles. In Experiment 6, the mixture of the indium powder and hydrogen storage particles was subjected to heat treatment at 200° C. for formation of the agglomerates.

Specifically, the indium powder was added for mixture with the alloy powder #1 in the amounts, by weight, of 0.1 parts, 0.5 parts, 1.0 part, 5.0 parts, 10.0 parts and 15.0 parts, with respect to 100 parts by weight of the alloy powder #1. Each sample mixture was placed in an electric furnace with the flow of an argon gas, for heat treatment at 200° C. for 60 minutes, and subsequently allowed to cool naturally to a room temperature. As a result, sample powders "F-1" through "F-6" were obtained.

As analogous to the above-described Experiment 1, each of the sample powders F-1 through F-6 thus prepared was used to fabricate a hydrogen storage alloy electrode which was then assembled into an alkaline storage battery for measurement of pressure build-up time and initial discharge characteristics. The results are given in Table 8. Since the sample powder F-3 is equivalent to the sample powder E-1 of Experiment 5, the designation E-1 is indicated in parentheses following the designation F-3 in Table 8.

TABLE 8

| DESIGNATION OF SAMPLE POWDER | AMOUNT OF INDIUM POWDER (parts by weight) | PRESSURE BUILD-UP TIME (min) | INITIAL DISCHARGE CAPACITY (mAh) |
| --- | --- | --- | --- |
| F1 | 0.1 | 120 | 660 |
| F2 | 0.5 | 150 | 760 |
| F3 (E1) | 1.0 | 160 | 830 |
| F4 | 5.0 | 155 | 850 |
| F5 | 10.0 | 146 | 820 |
| F6 | 15.0 | 115 | 790 |
| Y | — | 95 | 620 |

As can be appreciated from Table 8, the respective alkaline storage battery exhibits a lower level of internal pressure build-up when incorporating any one of the sample powders F-1 through F-6 in its negative electrode than when incorporating the sample powder Y in its negative electrode. As can also be appreciated from Table 8, the respective alkaline storage battery exhibits a higher level of initial discharge capacity when incorporating any one of the sample powders F-1 through F-6 in its negative electrode than when incorporating the sample powder Y in its negative electrode.

It has been found from these results that the addition amount of the indium powder is preferably in the range of 0.1–15.0 parts by weight, more preferably in the range of 0.5–10.0 parts by weight, with respect to 100 parts by weight of the hydrogen storage alloy particles.

The indium powder was used above as the illustrative metallic powder. It has also been recognized that the similar results are obtainable with the use of a tin or zinc powder.

The hydrogen storage alloy particles used in the forgoing Experiments were those particles produced by arc melting. However, the hydrogen storage alloy particles produced by other techniques, such as gas atomization and roll quenching, can also be used to give the similar results.

The hydrogen storage alloy electrode of the present invention includes the agglomerates of fine hydrogen storage alloy particles, having a large specific surface area, joined together by the metallic layer. The hydrogen alloy particles, when in the form of such agglomerates, are less subjected to surface oxidation and exhibit the reduced contact resistance therebetween than when in individualized form. Therefore, the alkaline storage battery, using this hydrogen storage alloy electrode for its negative electrode, can exhibit a high level of initial discharge capacity immediately after assembly, as well as a low level of internal pressure build-up during discharge.

What is claimed is:

1. A hydrogen storage alloy electrode comprising a hydrogen storage alloy powder, said hydrogen storage alloy powder including agglomerates of hydrogen storage alloy particles joined together through a metallic layer which covers outer surface portions of said hydrogen storage alloy particles.

2. The hydrogen storage alloy electrode of claim 1, wherein said hydrogen storage alloy particles of said agglomerates have sizes not exceeding 25 $\mu$m.

3. The hydrogen storage alloy electrode of claim 2, wherein said hydrogen storage alloy powder further includes hydrogen storage alloy particles of sizes exceeding 25 $\mu$m but not exceeding 100 $\mu$m in combination with said agglomerates of said hydrogen storage alloy particles of sizes not exceeding 25 $\mu$m.

4. The hydrogen storage alloy electrode of claim 3, further comprising an electrically conductive core and a paste base, wherein said hydrogen storage alloy powder is contained in said paste base to form a paste which is coated on or loaded in said electrically conductive core.

5. The hydrogen storage alloy electrode of claim 1, wherein said hydrogen storage alloy powder further includes hydrogen storage alloy particles of sizes exceeding 25 $\mu$m but not exceeding 100 $\mu$m in combination with said agglomerates of hydrogen storage alloy particles.

6. The hydrogen storage alloy electrode of claim 1, wherein said hydrogen storage alloy particles of said agglomerates have sizes not exceeding 100 $\mu$m.

7. The hydrogen storage alloy electrode of claim 6, further comprising an electrically conductive core and a paste base, wherein said hydrogen storage alloy powder is contained in said paste base to form a paste which is coated on or loaded in said electrically conductive core.

8. The hydrogen storage alloy electrode of claim 1, wherein said metallic layer is formed of at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb).

9. The hydrogen storage alloy electrode of claim 1, wherein said metallic layer has been deposited on said outer surface portions of said hydrogen storage alloy particles by immersing said hydrogen storage alloy particles in an acid solution into which is dissolved a metallic compound containing at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb).

10. The hydrogen storage alloy electrode of claim 9, wherein said metallic compound is contained in said acid solution in an amount of 1.0 to 10.0 parts by weight, based on 100 parts by weight of said hydrogen storage alloy particles.

11. The hydrogen storage alloy electrode of claim 1, wherein said metallic layer has been formed from a powder of at least one metal selected from the group consisting of indium (In), tin (Sn) and zinc (Zn) by mixing said powder with said hydrogen storage alloy particles to form a resulting mixture and subjecting said resulting mixture to a heat treatment.

12. The hydrogen storage alloy electrode of claim 7, wherein said metallic powder has been added in an amount of 0.5 to 10.0 parts by weight, based on 100 parts by weight of said hydrogen storage alloy particles.

13. The hydrogen storage alloy electrode of claim 1, further comprising an electrically conductive core and a paste base, wherein said hydrogen storage alloy powder is contained in said paste base to form a paste which is coated on or loaded in said electrically conductive core.

14. An alkaline storage battery including the hydrogen storage alloy electrode of claim 1.

15. A hydrogen storage alloy electrode comprising a hydrogen storage alloy powder that comprises agglomerates,
   wherein each one of said agglomerates comprises a metallic material and a plurality of hydrogen storage alloy particles that each consist of the same hydrogen storage alloy composition and that are joined to one another by said metallic material, and
   wherein said metallic material forms a metallic layer that covers outer surface portions of said hydrogen storage alloy particles and joins said hydrogen storage alloy particles to one another.

16. A method for fabrication of a hydrogen storage alloy electrode comprising the steps of:

joining hydrogen storage alloy particles to one another through a metallic layer to form agglomerates, wherein said metallic layer covers outer surface portions of said hydrogen storage alloy particles; and using a hydrogen storage alloy powder including said agglomerates to fabricate the hydrogen storage alloy electrode.

17. The method of claim 16, wherein said joining step comprises depositing said metallic layer on said outer surface portions of said hydrogen storage alloy particles by immersing said hydrogen storage alloy particles in an acid solution into which is dissolved a metallic compound containing at least one metal selected from the group consisting of scandium (Sc), titanium (Ti), vanadium (V), chromium (Cr), manganese (Mn), iron (Fe), cobalt (Co), nickel (Ni), copper (Cu), zinc (Zn), molybdenum (Mo), palladium (Pd), silver (Ag), indium (In), tin (Sn) and antimony (Sb).

18. The method of claim 17, further comprising maintaining a pH of said acid solution within a range of 0.7 to 2.0.

19. The method of claim 17, wherein said metallic compound is contained in said acid solution in an amount of 1.0 to 10.0 parts by weight, based on 100 parts by weight of said hydrogen storage alloy particles.

20. The method of claim 16, wherein said joining step includes the steps of mixing said hydrogen storage alloy particles with a metallic powder of at least one metal selected from the group consisting of indium (In), tin (Sn) and zinc (Zn) to form a mixture, and heating said mixture under an inert atmosphere to a temperature within a range from a melting point of said metallic powder to 500° C. to form said metallic layer through which said hydrogen storage alloy particles are joined together to form said agglomerates.

21. The method of claim 20, wherein said mixing step comprises adding said metallic powder in an amount of 0.5 to 10.0 parts by weight, based on 100 parts by weight of said hydrogen storage alloy particles.

* * * * *

UNITED STATES PATENT AND TRADEMARK OFFICE
CERTIFICATE OF CORRECTION

PATENT NO. : 6,258,482 B1  Page 1 of 1
DATED : July 10, 2001
INVENTOR(S) : Ouchi et al.

It is certified that error appears in the above-identified patent and that said Letters Patent is hereby corrected as shown below:

Column 9,
Lines 19 to 22, delete these entire lines.

Column 14,
Line 46, after "claim", replace "7," by -- 11, --.

Signed and Sealed this

Eighth Day of April, 2003

JAMES E. ROGAN
*Director of the United States Patent and Trademark Office*